United States Patent [19]

Crowley Daniel J. et al.

[11] 4,375,071
[45] Feb. 22, 1983

[54] MOUNTING MEANS FOR MAGNETIC READ HEAD

[75] Inventors: Crowley Daniel J., Harrisburg; Jon D. Stine, Elizabethtown, both of Pa.

[73] Assignee: AMP Incorporated, Harrisburg, Pa.

[21] Appl. No.: 198,750

[22] Filed: Oct. 20, 1980

[51] Int. Cl.³ .......................... G11B 5/48; G11B 21/16
[52] U.S. Cl. .................................. 360/104; 360/109
[58] Field of Search ............... 360/104, 103, 105, 109, 360/2, 130.3; 235/449–450

[56] References Cited

U.S. PATENT DOCUMENTS

| | | | |
|---|---|---|---|
| 4,167,664 | 9/1979 | Pass | 360/109 X |
| 4,167,664 | 9/1979 | Pass | 235/449 |
| 4,291,350 | 9/1981 | King et al. | 360/104 |
| 4,297,735 | 10/1981 | Eppich | 360/104 |

Primary Examiner—John H. Wolff
Attorney, Agent, or Firm—Russell J. Egan

[57] ABSTRACT

An improved means for mounting a magnetic read head in a card reader is disclosed. The subject mounting means is simpler in construction and requires both fewer parts and smaller space in which to operate than previous mounting means. The subject mounting means allows the magnetic read head to move to conform to the plane of a magnetic stripe on a card as the card is passed beneath the read head.

4 Claims, 4 Drawing Figures

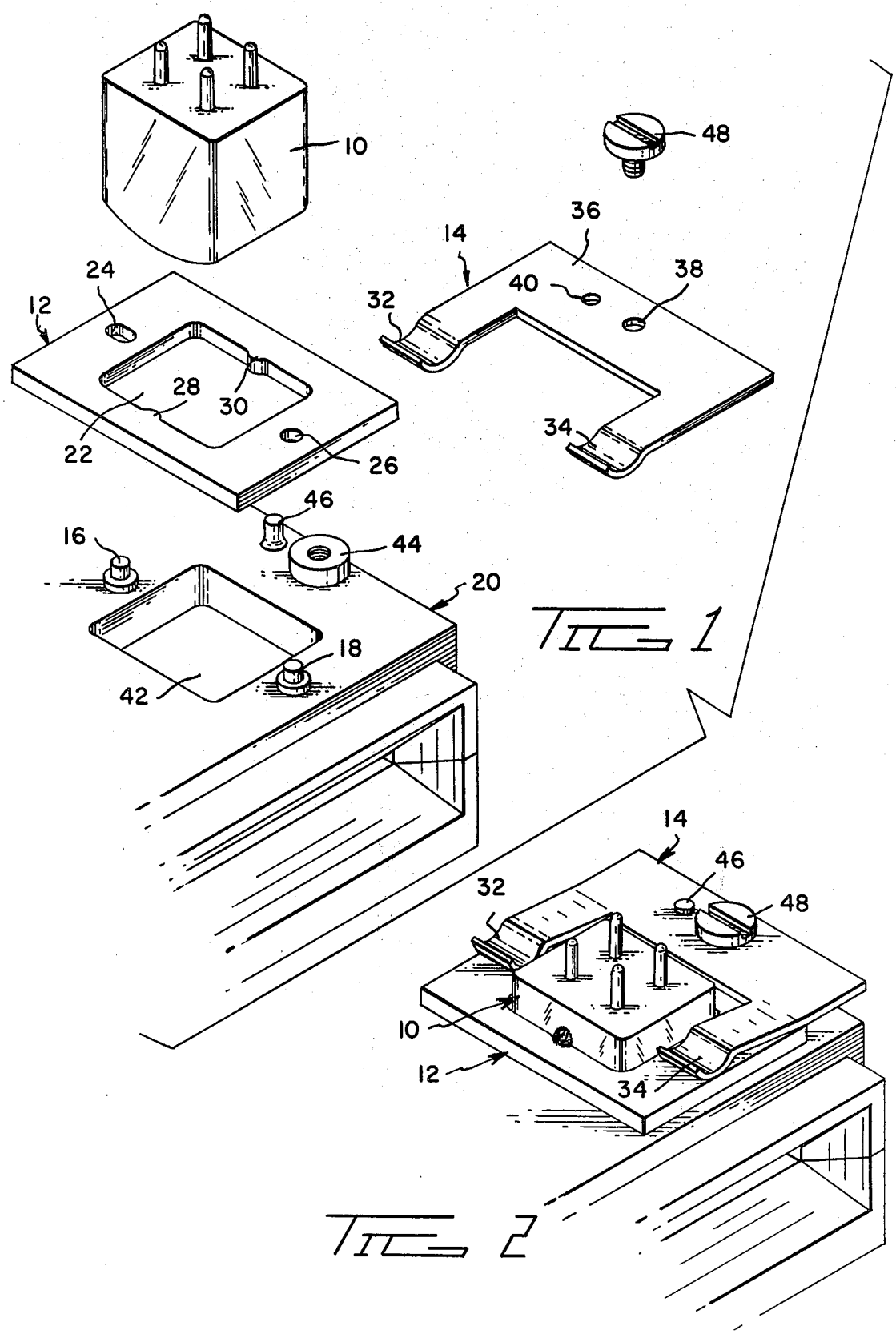

MOUNTING MEANS FOR MAGNETIC READ HEAD

BACKGROUND OF THE INVENTION

1. The Field of the Invention

The present invention relates to a means for mounting a magnetic read head in a card reader or the like.

2. The Prior Art

There have been many successful schemes for mounting magnetic read heads in card readers and the like. These mounting assemblies have usually included a gimbaling means which allow the magnetic read head to have a substantial amount of float to accommodate irregularities in the cards. However, the previous mounting means have all been somewhat cumbersome in that they have required a large number of parts and a large amount of space in order to arrive at an arrangement which will accommodate movement of the magnetic read head about several axes. An example of a prior art mounting means can be found in U.S. Pat. No. 4,167,664.

SUMMARY OF THE INVENTION

The mounting means according to the present invention has an annular plate secured to the magnetic read head parallel to and spaced from a reading portion thereof. The card reader housing has a pair of spaced integral studs which are received in bores in the plate. A bifurcated spring member is mounted on the housing with an arm thereof lying on each side of the read head and overlying the studs to bias the plate against the studs. The read head is capable of relative movement along the studs with the movement restrained by the spring member.

It is therefore an object of the present invention to produce a mounting means for a magnetic read head which will provide for relative movement of the read head as a plastic card bearing a magnetic stripe is passed under the read portion of the head.

It is a futher object of the present invention to produce a mounting assembly for a magnetic read head which will provide limited and restrained movement of the head to accommodate irregularities in a magnetic stripe being read.

It is a further object of the present invention to provide a mounting means for a magnetic read head of a card reader which mounting means is of relatively simple structure providing both economy of parts and space for the mounting.

It is a further object of the present invention to produce an improved mounting means for a magnetic read head which means can be readily and economically manufactured.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 1 is an exploded perspective view of the present invention;

FIG. 2 is a perspective view of the subject invention in an assembled condition;

DETAILED DESCRIPTION OF THE PREFERRED EMBODIMENT

Figure 3:
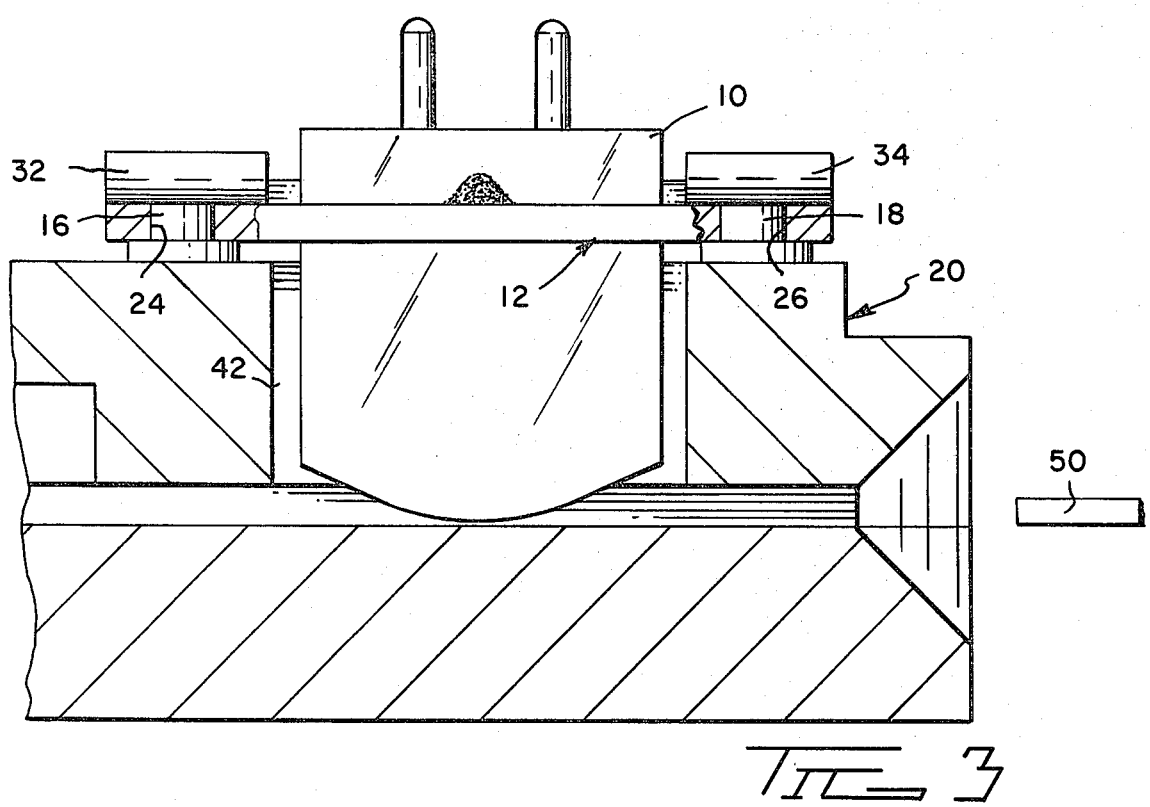
FIG. 3 is a side elevation, partly in section, showing a magnetic read head mounted in accordance with the present invention and ready to receive a card to be read thereby.

The means for mounting a magnetic read head 10 according to the present invention comprises a plate 12, a spring member 14, and mounting studs 16, 18 integral with a card reader housing 20.

Figure 4:
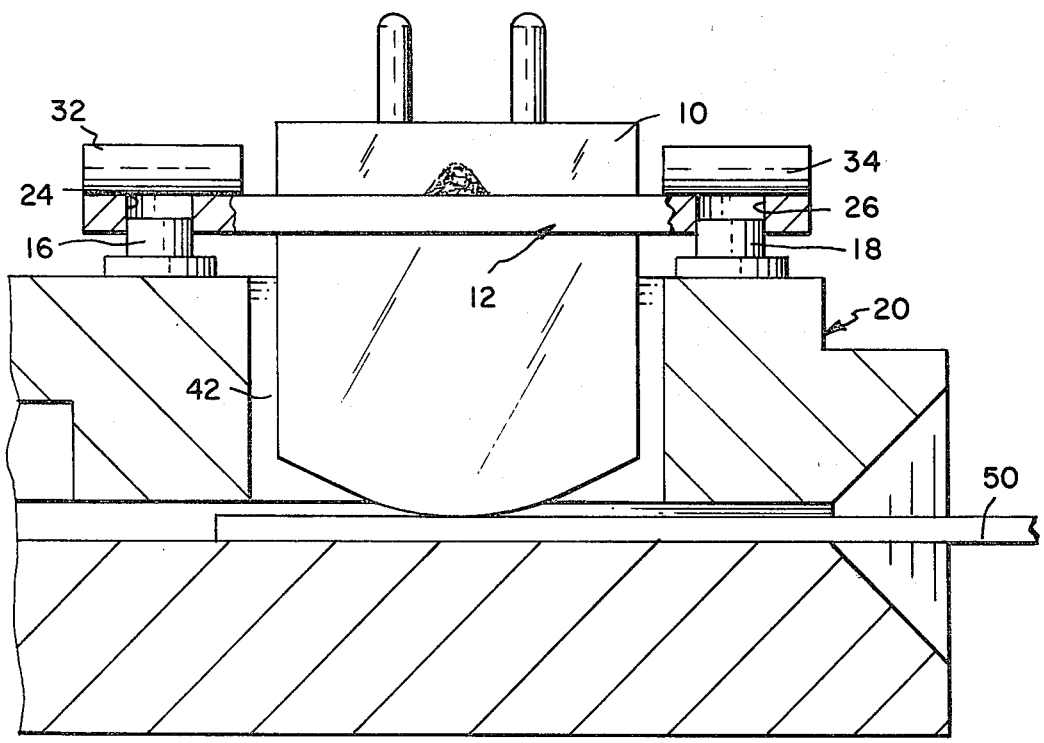
FIG. 4 is a side elevation, partly in section, showing the float of the magnetic read head achieved by the present invention.

The plate 12 is of generally rectangular shape having a profiled central aperture 22 and a pair of mounting bores 24, 26 aligned on opposite sides of the aperture 22. The aperture can also be profiled to include inwardly directed mounting bumps 28, 30. The plate 12 is secured to the magnetic read head 10 intermediate the ends thereof, as shown in FIGS. 3 and 4. The plate is fixedly secured to the magnetic read head by any known means, such as soldering.

The spring member 14 is a bifurcated member formed of resilient material having a pair of spaced arms 32, 34 extending in parallel spaced relation from a body portion 36. The body portion 36 has therein a central mounting bore 38, and an alignment bore 40 spaced to one side of the mounting bore 38.

The card reader housing 20 has a magnetic head receiving aperture 42 with integral studs 16, 18 aligned on opposite sides of the aperture 42 and spaced to receive the bores 24, 26, respectively, of the plate 12. The housing 20 also has a mounting extension 44 and alignment stud 46 positioned to one side of the aperture 42 and adopted to receive a mounting screw 48 and to extend through the alignment bore 40 of the spring member 14, respectively.

The mounting assembly is formed by first securing the plate 12 to a magnetic read head 10 as previously described. The assembly of the magnetic read head and plate is then placed in the aperture 42 with the studs 16, 18 extending through the respective bores 24, 26 of the plate 12. The spring member 14 is then mounted on the extension 44 with the stud 46 passing through the bore 40 to properly align the spring member. The spring member 14 is then secured to the housing by passing the screw 48 through the bore 38 into the extension 44. It will be noted that the spring arms are of such length as to approximately overlie the studs 16, 18, as can be best seen in FIG. 2.

The float achieved by the subject invention can best be appreciated by a comparison of FIGS. 3 and 4. In FIG. 3 the spring arms 32, 34 have biased the plate 12 to the full downward position. When a card 50 is inserted into the card reader 20, the magnetic read head 10 is lifted up against the force of the spring member 14, with this movement being accommodated for by movement of the plate along the studs 16, 18. The spring member 14 will prevent the plate from disengaging from the studs and help restrain the movement of the magnetic read head 10.

The present invention may be subject to many modifications and changes without departing from the spirit or essential characteristics thereof. The present embodiment is therefore to be considered in all respects as illustrative and not restrictive of the scope of the invention.

What is claimed is:

1. A means for mounting a magnetic read head in a card reader or the like comprising:
   an annular plate secured to and extending peripherally from said magnetic read head, said plate having at least two bores in opposed spaced relationship on opposite sides of said plate;
   a pair of mounting studs integral with a housing of said card reader, said studs being aligned to be received in the respective bores of said plate and having a length greater than the thickness of said plate; and
   a spring member having a pair of parallel spaced arms engaging said plate on opposite sides of said magnetic read head overlying said studs whereby said magnetic read head is mounted on said studs for relative movement therealong allowing limited float.

2. In combination with a magnetic card reader having a housing defining a card receiving path, a magnetic read head mounting aperture opening into said path, and a magnetic read head, means for mounting said magnetic read head in said aperture comprising:
   an integral stud on each of two opposite sides of said aperture substantially intermediate the length thereof;
   a mounting plate having a profiled central aperture receiving said magnetic read head therein and a pair of bores aligned on two opposite sides of said plate substantially intermediate the width of said magnetic read head, said plate being fixedly secured to said magnetic read head and being of lesser thickness than the length of said studs; and
   a bifurcated spring member mounted on said housing with the arms thereof extending substantially over said mounting studs whereby said magnetic read head is mounted on said studs by passage of said studs through the apertures of said plate and is constrained for limited movement therealong by action of said spring.

3. A means for mounting a magnetic read head in a card reader or the like comprising:
   means forming a peripheral flange intermediate the top and bottom of said magnetic read head, at least two bores in said flange in opposed spaced relationship on opposite sides of said magnetic read head;
   a pair of mounting studs integral with a housing of said card reader spaced on opposite sides of a magnetic head receiving opening, said studs being aligned to be received in respective bores of said flange and being of greater length than the thickness of said flange; and
   a spring member having a pair of parallel spaced arms engaging said plate on opposite sides of said magnetic read head to overlie said studs whereby said magnetic read head is mounted on said studs for relative limited floating movement therealong.

4. In combination with a magnetic card reader having a housing defining a card receiving path a magnetic read head aperture opening into one side of said path, a magnetic read head, and means for mounting said magnetic read head in said aperture comprising:
   a pair of studs each integral with said housing and aligned on opposite sides of said aperture substantially intermediate the length thereof;
   a flange secured intermediate the length of said magnetic read head and having a pair of bores aligned on two opposite sides of said magnetic read head substantially intermediate the width thereof and aligned to receive a respective one of said studs therein, said studs being of greater length than the thickness of said flange; and
   a C-shaped spring member mounted on said housing with an arm thereof extending substantially over each of said mounting studs whereby said magnetic read head is mounted on said studs by passage of said studs through the apertures of said flange means and is constrained for limited movement therealong by action of said spring.

* * * * *